US011343875B2

(12) United States Patent
Liu et al.

(10) Patent No.: US 11,343,875 B2
(45) Date of Patent: May 24, 2022

(54) MOBILE TERMINAL AND WIRELESS COMMUNICATION MODULE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 7 days.

(21) Appl. No.: 16/629,527

(22) PCT Filed: Aug. 18, 2017

(86) PCT No.: PCT/CN2017/098117
§ 371 (c)(1),
(2) Date: Jan. 8, 2020

(87) PCT Pub. No.: WO2019/033414
PCT Pub. Date: Feb. 21, 2019

(65) Prior Publication Data
US 2020/0154519 A1 May 14, 2020

(51) Int. Cl.
*H04M 1/725* (2021.01)
*H04W 88/06* (2009.01)
(Continued)

(52) U.S. Cl.
CPC .............. *H04W 88/06* (2013.01); *G16Y 40/30* (2020.01); *H04L 67/04* (2013.01);
(Continued)

(58) Field of Classification Search
CPC ................................ H04W 4/44; H04W 88/06
See application file for complete search history.

(56) References Cited

U.S. PATENT DOCUMENTS

| 9,131,532 B2 | 9/2015 | Postma et al. |
| 2016/0165382 A1 | 6/2016 | Picquenot et al. |

(Continued)

FOREIGN PATENT DOCUMENTS

| CN | 1367623 A | 9/2002 |
| CN | 1604674 A | 4/2005 |

(Continued)

OTHER PUBLICATIONS

EPO Search Report for EP Application No. 17921596.7 dated Mar. 23, 2020.

(Continued)

*Primary Examiner* — Tuan H Nguyen
(74) *Attorney, Agent, or Firm* — Young Basile Hanlon & MacFarlane, P.C.

(57) ABSTRACT

The present application relates to the field of mobile communications. Disclosed are a mobile terminal and a wireless communication module. In the present disclosure, an optional wireless communication function is packaged in a pluggable wireless communication module; a physical interface conforming to industry standards is reserved on a host of a mobile terminal so as to be used for connecting the wireless communication module; and the host can immediately have a specific wireless communication function merely by means of having a specific wireless communication module plugged into same.

20 Claims, 1 Drawing Sheet

(51) Int. Cl.
  *H04W 4/44*      (2018.01)
  *H04W 4/80*      (2018.01)
  *G16Y 40/30*     (2020.01)
  *H04L 67/04*     (2022.01)
  *H04W 84/18*     (2009.01)
  *H04M 1/72409*   (2021.01)

(52) U.S. Cl.
  CPC ......... *H04M 1/72409* (2021.01); *H04W 4/44* (2018.02); *H04W 4/80* (2018.02); *H04W 84/18* (2013.01)

(56) References Cited

U.S. PATENT DOCUMENTS

2017/0006510 A1* 1/2017 Kaikkonen ....... H04W 36/0094
2017/0171833 A1  6/2017 Vamaraju et al.
2018/0124748 A1* 5/2018 Baldemair ........ H04W 74/0833

FOREIGN PATENT DOCUMENTS

| CN | 202696911 U   | 1/2013  |
| CN | 103246838 A   | 8/2013  |
| WO | 9429968 A1    | 12/1994 |
| WO | 2011148087 A1 | 12/2011 |
| WO | 2016195751 A1 | 12/2016 |

OTHER PUBLICATIONS

Santa et al.. Architecture and evaluation of a unified V2V and V2I communication system based on cellular networks, ScienceDirect, Dec. 23, 2007. (2850-2861 pages).
India First Examination Report for IN Application 202017000946 dated Apr. 8, 2021. (6 pages).
European Examination Report for EP Application 17921596.7 dated Feb. 5, 2021. (6 pages).
Summons to attend oral proceedings pursuant to Rule 115(1) EPC for EP Application 17921596.7 mailed Jul. 26, 2021. (8 pages).
PC Card, Wikipedia, https://en.wikipedia.orgAv/index.php?title=PC_Card&oldid=792725469, Jul. 12, 2021. (7 pages).

* cited by examiner

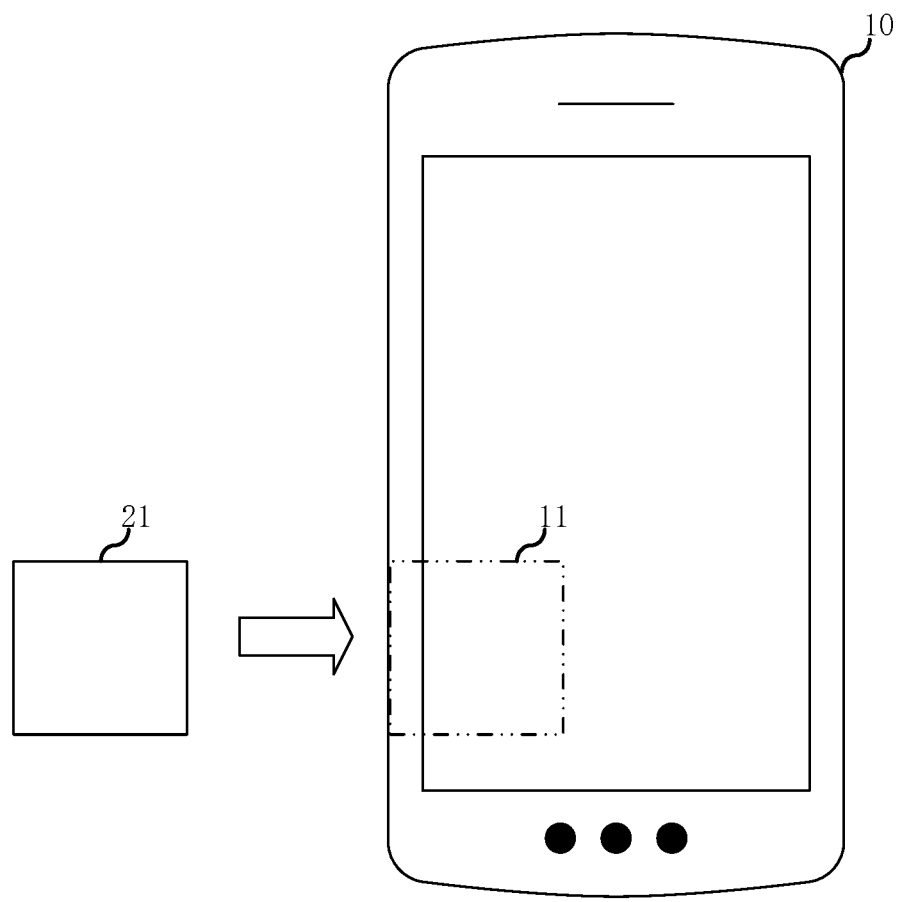

MOBILE TERMINAL AND WIRELESS COMMUNICATION MODULE

CROSS-REFERENCE TO RELATED APPLICATION(S)

This application is a 371 application of International Application No. PCT/CN2017/098117, filed on Aug. 18, 2017, the entire disclosure of which is hereby incorporated by reference.

TECHNICAL FIELD

The present application relates to the field of mobile communication.

BACKGROUND

For a current smartphone, all communication modules are built into the phone, or the smartphone integrates all functions into a set of chips. Communication modules of a typical 4G (fourth generation mobile communication system) smartphone include a 4G communication module of multiple standards, a WIFI communication module, a bluetooth module, a near field communication (NFC) module and the like.

The inventor of the present disclosure found that, with the development of mobile communication technology, wireless communication functions of new standards are continuously increasing, and wireless communication functions of how many standards are integrated into the smartphone becomes an urgent problem to be solved. If wireless communication functions of all standards are integrated in a smartphone, it will inevitably lead to a significant increase in cost. If only some wireless communication functions of common standards are integrated into the smartphone, the application scenarios of the smartphone will be greatly limited due to the lack of functions. Smartphone manufacturers need to integrate as many wireless communication functions as possible in a smartphone to suit as many users as possible, and also need to integrate as few wireless communication functions as possible in a smartphone to save costs. This technical contradiction has not been solved.

SUMMARY

An objective of the present application is to provide a mobile terminal and a wireless communication module to solve the contradiction between cost and application range.

To solve the foregoing problem, the present application discloses a mobile terminal including a host and at least one pluggable wireless communication module.

The host includes at least one reserved physical interface.

The host and the wireless communication module are connected through the physical interface.

In a preferred implementation, the wireless communication module is configured to provide the mobile terminal with a function of communicating with an external wireless network.

In a preferred implementation, the wireless communication module includes a baseband and/or radio frequency processing unit of at least one wireless communications standard.

In a preferred implementation, the wireless communication module is connected or disconnected with the host through a hot-plug mode.

In a preferred implementation, the physical interface is located in the front of, or the rear of, or at the top of, or at the bottom of, or at the left side of, or at the right side of the mobile terminal.

In a preferred implementation, the physical interface is a standardized physical interface that is specified by an industry, or specified by a protocol, or commonly used in the industry.

The wireless communication module conforms to industry specifications, or protocol specifications, or a standard commonly used in the industry.

In a preferred implementation, the wireless communication module and the physical interface are matched according to the industry specifications, or the protocol specifications, or a rule commonly used in the industry.

In a preferred implementation, the mobile terminal is a smartphone or a tablet computer.

In a preferred implementation, the wireless communication module is an NB-IOT module or a V2X module.

In a preferred implementation, a wireless communication function corresponds to a reserved physical interface and a wireless communication module.

In a preferred implementation, multiple wireless communication functions correspond to a same reserved physical interface and a same wireless communication module.

The present application further discloses a host of a mobile terminal, including at least one reserved physical interface, wherein the physical interface is configured to connect with at least one pluggable wireless communication module.

The present application further discloses a wireless communication module in a pluggable design and configured to connect to a reserved physical interface of a host of a mobile terminal.

Compared with the prior art, an implementation of the present application has at least the following differences and effects: an optional wireless communication function is encapsulated in a pluggable wireless communication module; a physical interface conforming to an industry standard is reserved on a host of a mobile terminal, to connect to the wireless communication function, and the host is capable of having a specific wireless communication function as long as a specific wireless communication module is inserted into the host.

A large number of technical features are recorded in the specification of the present application and distributed in various technical schemes. If all possible combinations of technical features (i.e. technical schemes) of the present application are listed, the specification will be too lengthy. In order to avoid this problem, various technical features disclosed in the above summary of the present application, various technical features disclosed in the following implementations and implementations, and various technical features disclosed in the drawings can be freely combined with each other to form various new technical schemes (all of which are deemed to have been recorded in this specification), unless such combination of technical features is not technically feasible. For example, feature A+B+C is disclosed in one example, feature A+B+D+E is disclosed in another example. Features C and D are equivalent technical means that play the same role, only one of which is technically necessary to be chosen, and cannot be used at the same time. Feature E may be technically combined with feature C. Then, the scheme of A+B+C+D should not be considered as already recorded because of the technical infeasibility, while the scheme of A+B+C+E should be considered as already recorded.

BRIEF DESCRIPTION OF DRAWINGS

FIG. 1 is a schematic structural diagram of a mobile terminal according to a first implementation of the present disclosure.

DETAILED DESCRIPTION

In the following description, many technical details are set forth in order to enable readers to better understand the present application. However, those skilled in the art can understand that the technical schemes claimed in the claims of the present application can be implemented without these technical details and based on various changes and modifications of the following implementations.

Description of some concepts:

A module refers to a combination of software and hardware with an independent physical structure to realize a specific function, which may also be called a unit.

A physical interface refers to an interface with a physical structure, and the physical interface includes specifications for the physical structure, electrical, an interaction protocol, and the like. The connection of two objects through a physical interface includes the match of physical structures, electrical and protocols, rather than the match of physical structures only.

A host refers to a main part of a mobile terminal, or a part that is capable of independently completing basic functions of the mobile terminal.

A wireless communication module refers to a module that provides the host with an additional wireless communication function including a baseband and/or radio frequency function. There are various wireless communication functions, such as communication between a mobile terminal and a cellular network base station, point-to-point communication between mobile terminals, communication between a mobile terminal and the Internet of Things, and so on.

The word "pluggable" refers to that the wireless communication module would be connected to the host through the physical interface as required, or that the wireless communication module which has been connected to the host would be unplugged (disconnected) as required.

The word "multiple" refers to two or more than two.

The word "NB-IoT" refers to a narrow band Internet of Things based on cells. The NB-IoT supports the cellular data connection of low-power devices over a wide area network, and it is known as a low-power wide area network (LP-WAN). The NB-IoT supports the efficient connection of devices with long standby time and high network connection requirements.

The word "V2X" stands for Vehicle to X. The word "V2X" is a collective name for V2V (Vehicle to Vehicle), V2I (Vehicle to Instruction), V2P (Vehicle to Pedestrian), and so on. A series of traffic information, such as real-time road conditions, road information, and pedestrian information, may be obtained through V2X, so that long-distance environmental signals may be obtained.

The following outlines some of inventive steps of the present application.

A traditional mobile terminal is divided into a host and wireless communication modules. Wireless communication functions that are necessary or most commonly used are integrated in the host of the mobile terminal. A wireless communication function used only under a certain scenario is encapsulated in a wireless communication module which is physically independent. A physical interface satisfying an industry standard is set on the host. A corresponding interface of the mobile communication module is capable of being matched with the physical interface of the host. The wireless communication module is inserted into the host when required, so that a new wireless communication function may be conveniently added for the mobile terminal. Since there are only the most commonly used wireless communication functions in the host, the cost is relatively low. And since different wireless communication modules may be inserted according to needs to realize new wireless communication functions, the application scenarios of the mobile terminal may be greatly expanded, so that one mobile terminal is capable of being suitable for various users. Therefore, the contradiction between the cost and the application range is perfectly solved.

Preferably, for an additional wireless communication function, the baseband part may be implemented in the host, and the radio frequency part may be implemented in the wireless communication module. Thus the powerful processing capability of a processing chip in the host is fully utilized, and the overall cost of the mobile terminal in the mode where the host and the wireless communication modules are separated is reduced.

To make the objectives, technical solutions, and advantages of the present application clearer, the implementations of the present application are further described in detail below with reference to the accompanying drawings.

An implementation of the present disclosure relates to a mobile terminal. FIG. 1 is a schematic structural diagram of the mobile terminal. The mobile terminal includes a host 10 and at least one pluggable wireless communication module 21. The host 10 includes at least one reserved physical interface 11. The host 10 and the wireless communication module 21 are connected through the physical interface 11. FIG. 1 is only an example of a smartphone, and the present application is not limited to this example. The dotted line indicates that the physical interface 11 is inside the host 10, and the wireless communication module 21 may be inserted into the host 10 in the direction of the arrow in the figure.

In the following, the implementation details of the mobile terminal, wireless communication module, host and physical interface will be illustrated and explained in detail respectively.

Optionally, the mobile terminal is a smartphone. Optionally, the mobile terminal is a tablet computer. Optionally, the mobile terminal is a dedicated handheld wireless terminal for a specific industry (such as a handheld wireless terminal for a cash register).

The host includes the main hardware of the mobile terminal, such as a touch screen, a main processor, a memory chip and the like. The operating system of the mobile terminal generally runs in the host. On the basis of the host, other additional modules may be connected so as to add additional functions. For example, the basic functions of the mobile terminal may include calling, sending short messages, accessing the Internet, running APPs (Application Programs) and so on. For another example, for some mobile terminals, the basic functions may be to run the operating system and the APPs installed therein.

Optionally, one host is provided with a reserved physical interface. In the physical interface, various wireless communication modules with different functions may be inserted, that is, the physical interface and the wireless communication modules are in a one-to-many relationship. Optionally, one host is provided with multiple reserved physical interfaces of different types. In each physical interface, one type of wireless communication module may be inserted, and each type of wireless communication module realizes different wireless communication functions, that is, the physical interface and the wireless communication module are in a one-to-one relationship. Optionally, one host is provided with multiple reserved physical interfaces, and in each physical interface, wireless communication modules with different functions may be inserted.

Optionally, the wireless communication module includes a baseband processing unit and a radio frequency processing unit of one or more wireless communications standards. Optionally, the wireless communication module includes only a baseband processing unit of one or more wireless communications standards. Optionally, the wireless communication module includes only a radio frequency processing unit of one or more wireless communications standards.

Optionally, the wireless communication module is an NB-IOT module. Optionally, the wireless communication module is a V2X module. Optionally, the wireless communication module is an NFC module. The present application does not limit the type of the wireless communication module which may be another type of module that implements a certain wireless communication function.

Preferably, the wireless communication module is connected or disconnected with the host through a hot-plug mode. Optionally, the wireless communication module is inserted or unplugged after the host is powered off Preferably, the physical interface is a standardized physical interface that is specified by the industry, or specified by a protocol, or commonly used in the industry. Preferably, the wireless communication module conforms to industry specifications, or protocol specifications, or a standard commonly used in the industry. Preferably, the wireless communication module is matched with the reserved physical interface of the host according to industry specifications, or protocol specifications, or a rule commonly used in the industry. The match includes the match in physical structures and/or the electrical match and/or the match in interaction protocols and the like.

The physical interface may be located in the front of, or the rear of, or at the top of, or at the bottom of, or at the left side of, or at the right side of the mobile terminal. Optionally, there may be multiple physical interfaces located at different sides of the mobile terminal.

Optionally, the physical interface may be a slot, the wireless communication module is a card-shaped object, the size and shape of the wireless communication module are matched with the slot, and the wireless communication module may be completely or mostly inserted into the slot. Optionally, the physical interface may be of a hole-shaped structure, the wireless communication module is an elongated rod-shaped object, the length and shape of the wireless communication module are matched with the hole-shaped structure, and the wireless communication module may be completely or mostly inserted into the physical interface. Optionally, the physical interface is a socket of a standard communication interface, the wireless communication module has a plug of the standard communication interface, the wireless communication module and the host are connected through the socket and the plug, and a main body of the wireless communication module is attached to one side of the host.

Optionally, a wireless communication function corresponds to a reserved physical interface and a wireless communication module. For example, NB-IOT (Narrowband Internet of Things) corresponds to a reserved physical interface or a wireless communication module, and V2X corresponds to another reserved physical interface or another wireless communication module. Optionally, multiple wireless communication functions correspond to a same reserved physical interface and a same wireless communication module. For example, NB-IOT (Narrow Band Internet of Things) and V2X (Internet of Vehicles) correspond to a same reserved physical interface or a same wireless communication module.

Optionally, one physical interface may correspond to one or more wireless communication modules with different functions. Optionally, one wireless communication module may implement one or more wireless communication functions.

Optionally, one wireless communication module may support multiple wireless communication functions. By running configuration software in the host, a function supported by a current wireless communication module may be re-defined or selected in a user selection mode.

Preferably, the host is provided with a battery, and the wireless communication module is not provided with a battery. After the wireless communication module is inserted into the host, the input of the power supply is obtained from the physical interface of the host. Optionally, the host is provided with a battery, the wireless communication module is also provided with a battery, and the host and the wireless communication module each use their own battery to supply power. Optionally, the host is provided with a battery, and the wireless communication module is also provided with a battery. When the host or the wireless communication module runs out of the battery of itself, the host or the wireless communication module uses the other's battery to supply power.

In one implementation, the wireless communication module is used in the following manner.

The wireless communication module is inserted into the physical interface on the host of the mobile terminal.

After the host detects the insertion of the wireless communication module, the host is electrically connected with the inserted wireless communication module to supply power to the wireless communication module, and the wireless communication module performs a power-on self-test.

The host performs a validity check of the inserted wireless communication module. The validity check may include the check of manufacturer (to exclude illegal manufacturers), the check of software version and so on.

After the validity check is passed, the host establishes a wireless connection with an external wireless communication network through the wireless communication module.

The above use manner is only a typical example used for helping understand the technical scheme of the present application, and the present application is not limited to this use manner.

By encapsulating an optional wireless communication function in a pluggable wireless communication module, and reserving a physical interface on the host to connect to the wireless communication module, the host is capable of having a specific wireless communication function as long as a specific wireless communication module is inserted into the host. This reduces the cost of the host and can also flexibly implement various additional wireless communications according to the requirements of application scenarios. Users may purchase a host first, then purchase a required wireless communication module according to needs, and may even purchase multiple different wireless communication modules, insert a required wireless communication module according to needs in a different application occasion, and turn off the software of a wireless communication module or unplug the wireless communication module when it is not in use, so as to reduce the overall power consumption.

It should be noted that in the application documents of this patent, the relationship terms, such as "first," "second," and the like are only used to distinguish one entity or operation from another entity or operation, but do not necessarily require or imply that there is an actual relationship or order between these entities or operations. Moreover, the terms "include", "comprise" or any variants thereof are intended to cover a non-exclusive inclusion, such that processes, methods, articles, or devices, including a series of elements, include not only those elements that have been listed, but also other elements that have not be specifically been listed or the elements intrinsic to these processes, methods, articles, or devices. Without further limitations, elements limited by the wording "include(s) a/an . . . " and "comprise(s) a/an . . . " do not exclude additional identical elements in the processes, methods, articles, or devices including the listed elements. In the application document of the patent, performing an action according to an element indicates to performing the action at least according to the element. This includes two cases: performing the action only according to the element, and performing the action according to the element and other elements.

All the references mentioned in the present application are herein incorporated by reference into the present application, to the same extent as if each individual reference was individually indicated to be incorporated herein by reference. In addition, it should be understood that, after having reviewed the above contents of the present application, those ordinary skilled in the art can make variations and modifications to the present application, and these equivalents are still within the protection scope claimed by the present application.

What is claimed is:

1. A mobile terminal, comprising a host and at least one pluggable wireless communication module; wherein
the host comprises a battery and at least one reserved physical interface;
the wireless communication module is a Vehicle to X (V2X) module or a Narrow Band Internet of Things (NB-IOT) module;
the wireless communication module also comprises a battery;
the host and the wireless communication module are connected through the physical interface; and
when the battery of one of the host or the wireless communication module runs out of power, the one of the host or the wireless communication module uses the battery of the other of the host or the wireless communication module to supply power.

2. The mobile terminal according to claim 1, wherein the wireless communication module is configured to provide the mobile terminal with a function of communicating with an external wireless network.

3. The mobile terminal according to claim 2, wherein a wireless communication function corresponds to a reserved physical interface and a wireless communication module.

4. The mobile terminal according to claim 2, wherein multiple wireless communication functions correspond to a same reserved physical interface and a same wireless communication module.

5. The mobile terminal according to claim 1, wherein the wireless communication module comprises at least one of a baseband or a radio frequency processing unit of at least one wireless communications standard.

6. The mobile terminal according to claim 5, wherein a wireless communication function corresponds to a reserved physical interface and a wireless communication module.

7. The mobile terminal according to claim 5, wherein multiple wireless communication functions correspond to a same reserved physical interface and a same wireless communication module.

8. The mobile terminal according to claim 1, wherein the wireless communication module is connected or disconnected with the host through a hot-plug mode.

9. The mobile terminal according to claim 8, wherein a wireless communication function corresponds to a reserved physical interface and a wireless communication module.

10. The mobile terminal according to claim 8, wherein multiple wireless communication functions correspond to a same reserved physical interface and a same wireless communication module.

11. The mobile terminal according to claim 1, wherein the physical interface is located in a front location of, or a rear location of, or at a top location of, or at a bottom location of, or at a left side of, or at a right side of the mobile terminal.

12. The mobile terminal according to claim 1, wherein the physical interface is a standardized physical interface that is specified by an industry, or specified by a protocol, or commonly used in the industry; and
the wireless communication module conforms to industry specifications, or protocol specifications, or a standard commonly used in the industry.

13. The mobile terminal according to claim 12, wherein the wireless communication module and the physical interface are matched according to the industry specifications, or the protocol specifications, or a rule commonly used in the industry.

14. The mobile terminal according to claim 1, wherein the mobile terminal is a smartphone or a tablet computer.

15. The mobile terminal according to claim 1, wherein the wireless communication module is an NB-IOT module or a V2X module.

16. The mobile terminal according to claim 1, wherein a wireless communication function corresponds to a reserved physical interface and a wireless communication module.

17. The mobile terminal according to claim 1, wherein multiple wireless communication functions correspond to a same reserved physical interface and a same wireless communication module.

18. The mobile terminal according to claim 17, wherein the host selects, by software re-definition or a user selection mode, a function supported by the wireless communication module connected to the physical interface.

19. A host of a mobile terminal, comprising a battery and at least one reserved physical interface, wherein the physical interface is configured to connect with at least one pluggable wireless communication module, and wherein the wireless communication module is a Vehicle to X (V2X) module or a Narrow Band Internet of Things (NB-IOT) module; and wherein when the battery of the host runs out of power, the host uses a battery of the at least one pluggable wireless communication module to supply power.

20. A wireless communication module in a pluggable design and configured to connect to a reserved physical interface of a host of a mobile terminal, wherein the wireless communication module comprises a battery, wherein the wireless communication module is a Vehicle to X (V2X) module or a Narrow Band Internet of Things (NB-IOT) module and wherein when the battery of the wireless communication module runs out of power, the wireless communication module uses a battery of the host to supply power.

* * * * *